(12) United States Patent
Wang et al.

(10) Patent No.: US 9,307,593 B1
(45) Date of Patent: Apr. 5, 2016

(54) DYNAMIC BLEEDER CURRENT CONTROL FOR LED DIMMERS

(71) Applicant: Dialog Semiconductor Inc., Campbell, CA (US)

(72) Inventors: Xiaoyan Wang, Milpitas, CA (US); Nan Shi, Newark, CA (US); Clarita Chiting Knoll, San Leandro, CA (US); Guang Feng, Cupertino, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 14/799,133

(22) Filed: Jul. 14, 2015

Related U.S. Application Data

(60) Provisional application No. 62/050,704, filed on Sep. 15, 2014.

(51) Int. Cl.
*H05B 37/02* (2006.01)
*H05B 33/08* (2006.01)

(52) U.S. Cl.
CPC ........ *H05B 33/0818* (2013.01); *H05B 33/0845* (2013.01); *H05B 33/0887* (2013.01)

(58) Field of Classification Search
CPC ........... H05B 33/0815; H05B 33/0803; H05B 33/0827; H05B 33/0809; H05B 33/0845; H05B 33/0824; H05B 37/02; H05B 37/029; Y02B 20/347; Y02B 20/42
USPC ...... 315/291, 294, 297, 307, 312, 360, 185 R
See application file for complete search history.

(56) References Cited

U.S. PATENT DOCUMENTS

| | | | | |
|---|---|---|---|---|
| 8,692,479 B2 * | 4/2014 | Mercier | ............. | H05B 33/0809 315/185 R |
| 8,922,135 B2 * | 12/2014 | Sumitani | ............ | H05B 33/0815 315/201 |
| 2014/0159616 A1 * | 6/2014 | Wang | ................ | H05B 33/0845 315/307 |

* cited by examiner

*Primary Examiner* — Haissa Philogene
(74) *Attorney, Agent, or Firm* — Fenwick & West LLP

(57) ABSTRACT

LED lamp systems as described herein include a dimmer switch and a bleeder circuit. The bleeder circuit provides a bleeder current to management voltage and to prevent the dimmer switch from turning off prematurely. The bleeder circuit may monitor the AC input voltage outputted by the dimmer switch. When the AC input voltage is less than a first threshold, the bleeder circuit provides a bleeder current. When the AC input voltage is greater than a second threshold, the bleeder circuit adjusts the bleeder current to less than a predetermined level.

18 Claims, 4 Drawing Sheets

DYNAMIC BLEEDER CURRENT CONTROL FOR LED DIMMERS

CROSS-REFERENCE TO RELATED APPLICATION(S)

This application claims priority under 35 U.S.C. §119(e) to U.S. Provisional Patent Application Ser. No. 62/050,704, "Dynamic Bleeder Current Control For LED Dimmer," filed Sep. 15, 2014, which is incorporated herein by reference in its entirety.

BACKGROUND

1. Technical Field

The present disclosure relates to driving LED (Light-Emitting Diode) lamps and, more specifically, to adaptively dimming the LED lamps.

2. Description of the Related Arts

A wide variety of electronics applications now use LED lamps. These applications include architectural lighting, automotive head and tail lights, backlights for liquid crystal display devices, flashlights, and electronic signs. LED lamps have significant advantages compared to conventional lighting sources, such as incandescent lamps and fluorescent lamps. These advantages include high efficiency, good directionality, color stability, high reliability, long life time, small size, and environmental safety. Accordingly, LED lamps have replaced conventional lighting sources in many applications. For example, LED lamps are often used in applications where the brightness of the light source is adjusted, such as in a dimmable lighting system.

Dimmable lighting systems often use phase cut dimmer switches that employ a triac device to regulate the power delivered to a lamp by conducting during a certain period of an AC voltage supplied to the triac. To maintain the triac in the conducting state, a minimum holding current needs to be supplied to the triac. However, because LED lamp loads vary widely, triac devices may be unable to operate reliably. Furthermore, the minimum holding current varies widely among triac devices, which may further complicate the design of LED-based dimmable lighting systems. When the current through the triac device is less than a minimum holding current threshold, the triac device resets and pre-maturely turns off. As a result, LED lamps may prematurely turn off when they should be on, which may result in a perceivable light flicker or complete failure in the LED lamp.

SUMMARY

LED lamp systems as described herein include a dimmer switch and a bleeder circuit. The bleeder circuit provides a bleeder current to prevent the dimmer switch from turning off prematurely. Triac dimmers usually require about 100-200 mA to be turned on during a triggering operating mode. When triggered, triac dimmers enter into a triac conducting operating mode, where a triac dimmer continues to conduct until the current through the triac dimmer drops below a threshold current level (e.g., 5-20 mA). During the conducting operating mode, a triac dimmer may turn off when the current through the triac dimmer drops below the threshold current level, resulting in a perceivable flicker in the LED lamp. The bleeder circuit may monitor the AC input voltage outputted by the dimmer switch. When the AC input voltage is less than a first threshold, the bleeder circuit provides a bleeder current. When the AC input voltage is greater than a second threshold, the bleeder circuit adjusts the bleeder current to less than a predetermined level.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present disclosure can be readily understood by considering the following detailed description in conjunction with the accompanying drawings.

DETAILED DESCRIPTION OF EMBODIMENTS

The Figures (FIG.) and the following description relate to embodiments of the present disclosure by way of illustration only. It should be noted that from the following discussion, alternative embodiments of the structures and methods disclosed herein will be readily recognized as viable alternatives that may be employed without departing from the principles of the present disclosure.

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the embodiments of the disclosure described herein.

Figure 1:
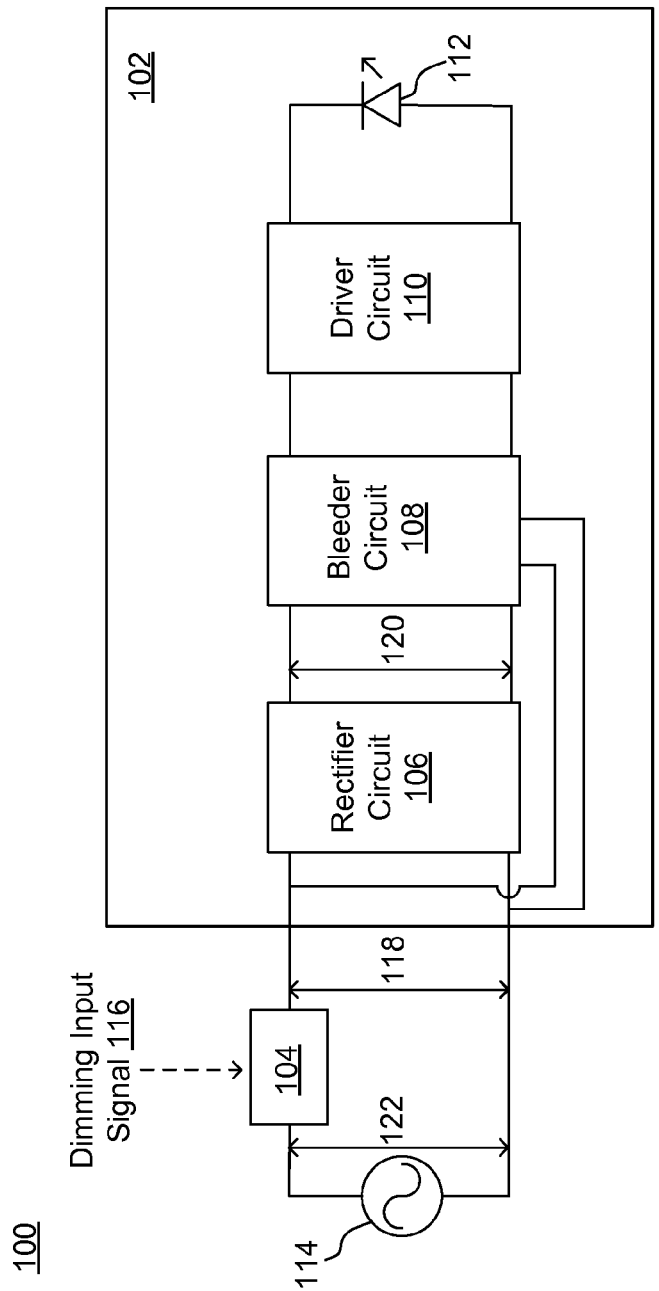
FIG. 1 is a circuit diagram illustrating an LED lamp system, according to one embodiment.

FIG. 1 is a circuit diagram illustrating an LED lamp system 100 comprising an alternating current (AC) mains 114, a dimmer switch 104, and an LED lamp circuit 102. The AC mains 114 provides an AC voltage 122 to the LED lamp circuit 102. The dimmer switch 104 is coupled in series with the AC mains 114 and the LED lamp circuit 102 including an LED string 112. The LED string 112 includes one or more LEDs. The dimmer switch 104 controls the amount (i.e., intensity) of light output by the LED string 112 by phase modulating the AC mains 114 to provide a regulated AC input voltage to the LED lamp circuit 102. In one embodiment, the dimmer switch 104 is a phase cut dimmer including a triac device (not shown). A triac device included in the dimmer switch 104 is a bidirectional device that can conduct current in either direction when it is turned on (or triggered). One example of a dimmer switch that includes a triac device is described in U.S. Pat. No. 7,936,132. When the dimmer switch 104 including a triac device is turned on, the dimmer switch 104 continues to conduct until the current through the dimmer switch 104 and the LED string 112 drops below a holding current threshold.

The dimmer switch 104 determines the amount of adjustment applied to AC voltage 122 provided by the AC mains 114 based on the value of a dimming input signal 116 applied to the dimmer switch 104. That is, the AC input voltage outputted by the dimmer switch is generated based on the value of the dimming input signal 116. In some implementations, the dimming input signal 116 is an analog signal produced by a knob, slider switch, or other suitable electrical or mechanical device capable of providing an adjustment signal with a variable range of adjustment settings. In other implementations, the dimming input signal 116 is a digital signal. The dimmer switch 104 outputs an AC input voltage 118 to the LED lamp circuit 102. The LED lamp circuit 102 adjusts the light output intensity of the LED string 112 substantially proportionally to the received AC input voltage 118, exhibiting behavior similar to incandescent lamps. The LED lamp circuit 102 controls the current through the LED string 112 in a regulated manner that provides a smooth transition in light intensity level output of the LED lamp circuit 102 responsive to the dimming input signal 116 without perceivable flicker.

The LED lamp circuit 102 comprises a rectifier circuit 106, a bleeder circuit 108, a driver circuit 110, and the LED string 112. The rectifier circuit 106 receives the AC input voltage 118 and outputs a rectified voltage 120 corresponding to the AC input voltage 118. The dimming level of the LED string 112 may be adjusted such that the current through the LED string 112 is below the holding current threshold of the triac device of the dimmer switch 104. In such case, the bleeder circuit 108 ensures the triac device of the dimmer switch 104 to remain conducting while the LED string 112 can be adjusted within a dimming setting. The bleeder circuit 108 turns on to provide a bleeder current when the AC input voltage 118 is below a first threshold voltage. As such, the bleeder circuit 108 provides a current path across the output of the rectifier circuit 106. The bleeder current provided by the bleeder circuit 108 discharges an input capacitor and provides a low impedance current path to ensure the triac device of the dimmer switch 104 to function properly. The internal timer of the triac device of the dimmer switch 104 can reset properly and charge up at the same time, which prevents dimmer phase jitter from cycle to cycle. In some embodiments, the bleeder circuit 108 provides bleeder current at different levels to reduce thermal loss and to increase the over-all system efficiency. When the AC input voltage 118 exceeds a second threshold voltage, the bleeder circuit 108 reduces the bleeder current. The second threshold voltage is greater than the first threshold voltage. Details of the bleeder circuit 108 will be further described with reference to FIG. 2. The driver circuit 110 provides a driving current to the LED string 112. The driver circuit 110 switches on and off thereby to regulate the driving current through the LED string 112 according to a duty cycle determined based on the rectified voltage 120.

Figure 2:
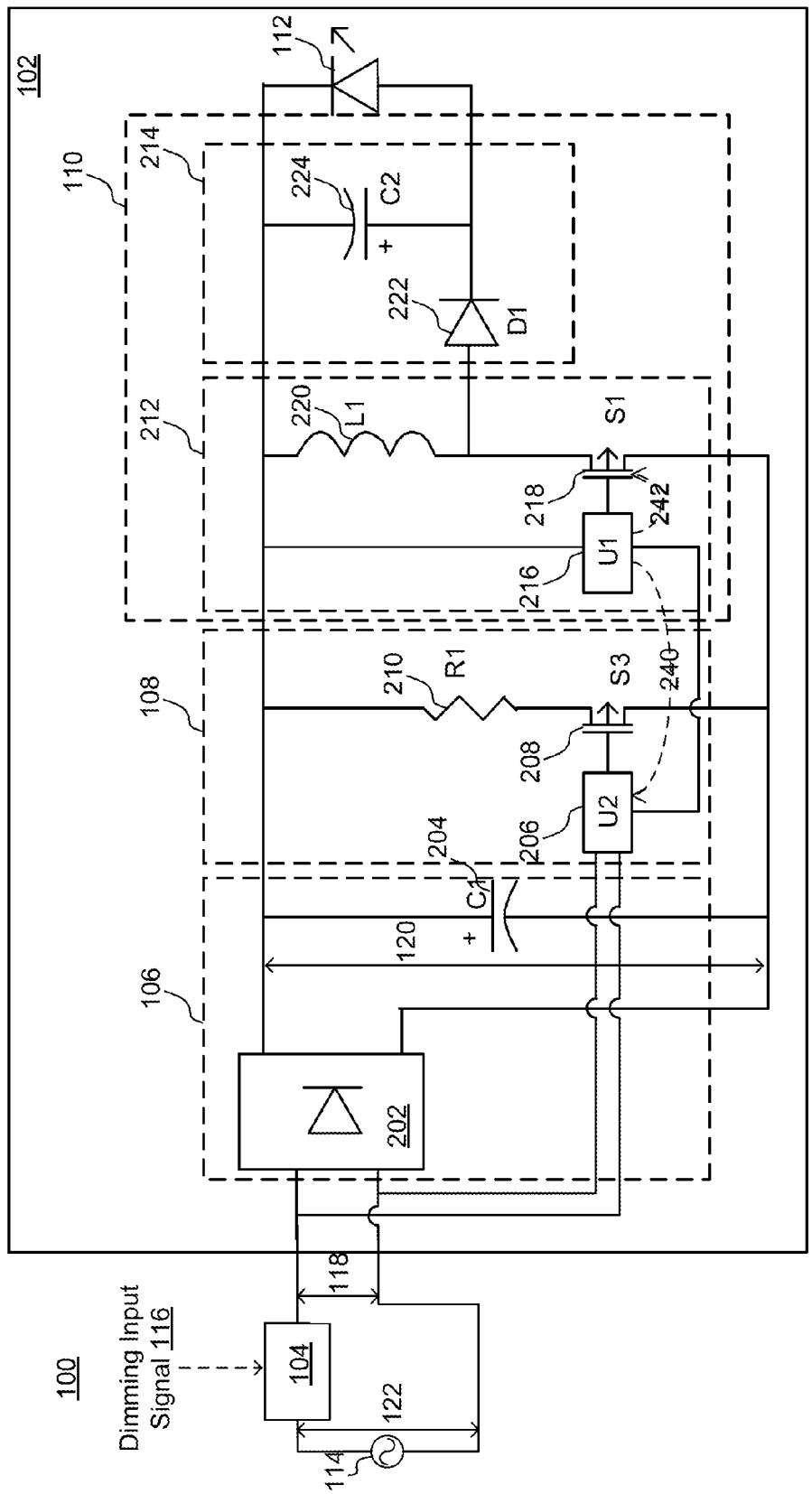
FIG. 2 is a circuit diagram illustrating an LED lamp system, according to one embodiment.

FIG. 2 is a circuit diagram illustrating an LED lamp system 100 including a dimmer switch 104 used in conjunction with an LED lamp circuit 102. The LED lamp circuit 102 controls dimming of the LED string 112 to achieve the desired dimming based on the dimming input signal 116. The LED lamp circuit 102 adaptively controls dimming in a manner that reduces or eliminates perceivable flickering of the LED string 112 throughout the dimming range, and causes the LED string 112 brightness to respond quickly and smoothly when the dimmer switch 104 is adjusted. In the illustrated example, the rectifier circuit 106 comprises a diode bridge 202 and a capacitor 204. The rectifier circuit 106 provides a rectified voltage 120, which is an unregulated direct current (DC) voltage to the bleeder circuit 108. The capacitor 204 is coupled in parallel to the output of the diode bridge 202. The diode bridge 202 generates a rectified voltage 120 based on the AC input voltage 118 outputted by the dimmer switch 104 based on the dimming input signal 116. The rectified voltage 120 is provided to the capacitor 204.

The bleeder circuit 108 comprises a bleeder circuit controller 206, a bleeder current switch 208, and a resistor 210. The bleeder circuit controller 206 regulates the bleeder current switch 208 to provide a bleeder current path across the output of the rectifier circuit 106 when the AC input voltage 118 outputted by the dimmer switch 104 is below a first threshold voltage. The bleeder circuit controller 206 monitors the AC input voltage 118, detects characteristics of the AC input voltage 118, and determines when the AC input voltage 118 reaches the first threshold voltage indicating that the AC input voltage 118 is at or near 0 volts (i.e., a zero crossing voltage). The bleeder circuit controller 206 may use one or a combination of digital or analog circuit techniques. In one implementation, the bleeder circuit controller 206 includes a digital sampling circuit (not shown) and a comparator (not shown). The digital sampling circuit samples the AC input voltage 118 at a specified interval or over a specified period of time. The samples are provided to the comparator that compares the value of a specified number of samples to detect whether the AC input voltage 118 is at or near the zero crossing voltage.

When the bleeder circuit controller 206 determines that the AC input voltage 118 is at or near the zero crossing voltage, i.e., below the first threshold voltage, the bleeder circuit controller 206 generates a control signal 242 to enable the bleeder circuit 108 by turning on the bleeder current switch 208 thereby to provide a path for the bleeder current through the resistor 210 across the output of the rectifier circuit 106. The bleeder current switch 208 may be a semiconductor power switch such as a metal oxide field effect transistor (MOSFET) as illustrated, a bipolar junction transistor (BJT), and the alike. As illustrated, the source of the bleeder current switch 208 may be coupled to a terminal of the output of the rectifier circuit 106, a drain may be coupled to the other terminal of the output of the rectifier circuit 106 via the resistor 210, and a gate is coupled to the output of the bleeder circuit controller 206. By determining when the AC input voltage 118 zero crossing occurs, the bleeder circuit controller 206 avoids enabling the bleeder circuit 108 during high dissipative periods and enables the bleeder circuit 108 when the triac of the dimmer switch 104 is in the OFF state. That is, when the AC mains 114 is disconnected from the dimmer switch 104.

The bleeder circuit 108 provides a current path across the output of the rectifier 106 during specified time periods to provide a low impedance current path to ensure the triac device of the dimmer switch 104 operates properly, such as stabilizing the dimmer phase. For example, the bleeder circuit 108 detects when the rectified voltage 120 outputted by the rectifier circuit 106 is at or below a first threshold value during each half cycle of the AC input voltage 118, at which point it enables the bleeder circuit 108 to provide a bleeder current having a value sufficient to discharge the capacitor 210. The bleeder circuit 108 may provide a bleeder current at different levels to ensure the triac device of the dimmer switch 104 operates properly and to reduce the thermal loss. For example, a bleeder circuit 108 may provide a high bleeder current at around 250 mA to 300 mA and a low bleeder current at around a half or a quarter of the high current level. While the dimmer switch 104 operates in the conducting state, the bleeder circuit 108 may regulate the amount of the bleeder current supplied to the dimmer switch 104 to ensure the dimmer switch remains in the conducting state. Such a regulation scheme avoids enabling the bleeder circuit 108 when the amount of energy stored in the capacitor 204 in the rectifier circuit 106 is at the maximum during each half cycle of the AC input voltage 118. This increases the overall system efficiency while ensuring the proper operation of the dimmer switch 104 because the bleeder circuit 108 is disabled during high dissipative operating periods, such as when the power stage is operating in output regulation mode.

The bleeder circuit 108 accurately detects the correct timing of the AC input voltage 118 to determine the bleeder current control and avoids enabling the bleeder circuit 108 when the amount of energy stored in the bulk capacitor 204 is at the maximum during each half cycle of the AC input voltage 118. This increases the overall efficiency of the LED lamp system 100 while ensuring the proper operation of the dimmer switch 104.

The bleeder circuit controller 206 reduces the bleeder current when the AC input voltage 118 is above a second threshold value during each half cycle of the AC input voltage 118. In one implementation, the bleeder circuit controller 206 disables the bleeder circuit 108 when the AC input voltage 118 is above a second threshold value. That is, when the driver circuit 110 operates, the bleeder circuit 108 is disabled and the bleeder current is reduced to zero. The bleeder circuit controller 206 may receive from the power stage controller 216, a signal 240 indicating whether the switching cycles of the driver circuit 110 have been enabled. The bleeder circuit controller 206 disables the bleeder circuit 108 by switching off the bleeder current switch 208 when the driver circuit 110 has been enabled.

In one embodiment, the bleeder circuit 108 provides different levels of bleeder current. For example, during periods when the driver circuit 110 is disabled, the bleeder circuit 108 may provide different levels of bleeder current to properly manage voltage and to reduce thermal loss. As another example, during periods when the driver circuit 110 is enabled, the current through the LED string 112 may still be below the holding current of the dimmer switch 104. The bleeder circuit 108 may provide a bleeder current to ensure the dimmer switch 104 remains conducting while the driver circuit 110 is enabled. In one implementation, the power stage controller 216 determines whether the regulation threshold is met by determining whether the energy being delivered to the output stage 214 is sufficient to maintain the proper output regulation of the LED string 112. The power stage controller 216 may measure the current loading of the dimmer switch 104 and compare the measured current to the holding current threshold or a range of threshold values. The regulation threshold value may be specified or dynamically adjusted based on the loading characteristics of the dimmer switch 104 and the LED string 112. When the bleeder circuit 108 determines that the driver circuit 110 is not operating, and based on an indication to maintain the output regulation, for example, provided by the power stage controller 216, the bleeder circuit 108 returns to the operating mode as previously described.

The power stage controller 216 may generate the indication to maintain the output regulation in response to determining the regulation threshold is not met.

The driver circuit 110 provides a driving current to the LED string 112. The driver circuit 110 comprises a power stage 212 and an output stage 214. The power stage 212 regulates the amount of energy provided to the output stage 214, and the output stage 214 supplies the driving current to the LED string 112. The power stage 212 includes a power stage controller 216, a power stage switch 218, and an inductor 220. The power stage controller 216 may detect the AC input voltage 118 outputted by the dimmer switch 104 and output a control signal 242 to activate or deactivate the power stage switch 218. For example, in one implementation, the power stage controller 216 may comprise an input coupled to the output of the dimmer switch 104 and measure the AC input voltage 118 outputted by the dimmer switch 104. When the measured AC input voltage 118 meets a specified threshold voltage level or range, the triac included in the dimmer switch 104 transitions into a conducting state during each half cycle of the AC input voltage 118. The power stage controller 216 regulates the driving current provided to the LED string 112 by controlling the duty cycle of the power stage switch 218. The power stage controller 216 generates a control signal 242 in a first state (e.g., ON) to activate the power stage switch 218 based on a determination that the measured AC input meets or exceeds the specified threshold value or range. When the AC input voltage 118 is at the threshold value during each half cycle of the AC voltage 122 of the AC mains 114, the power stage controller 216 generates a control signal 242 that transitions from the first state (e.g., ON) to a second state (e.g., OFF) to maintain output regulation. On the other hand, when the power stage controller 216 determines that the measured AC input voltage 118 is greater than a threshold indicating that the amount of energy being delivered to the output stage 214 is sufficient to maintain proper output regulation, the power stage controller 216 generates a control signal 242 in the second state (e.g., OFF) to deactivate the power stage switch 218. The power stage switch 218 may be a semiconductor power switch such as a MOSFET as illustrated, a BJT, and the alike.

The output stage 214 comprises a rectifier diode 222 and an output capacitor 224. The anode of the rectifier diode 222 is coupled to the drain of the power stage switch 218 and the cathode of the rectifier diode 222 is coupled to the positive terminal of the output capacitor 224. The rectifier diode 222 ensures the current through the LED string 112 flows from the anode of the LED string 112 to the cathode of the LED string 112. The capacitor 224 is connected in parallel with the LED string 112, where the anode of the LED string 112 is connected to the positive terminal of the output capacitor 224 and the cathode of the LED string 112 is connected to the negative terminal of the output capacitor 224. The capacitor 224 maintains the voltage across the LED string 112 is substantially constant. The rectifier diode 222 and the capacitor 224 together ensure reliable operation of the LED string 112.

Figure 3A:
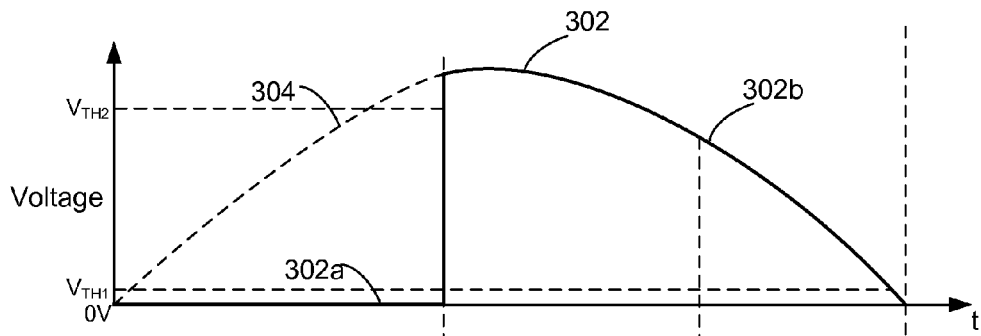
FIG. 3A illustrates example voltage waveforms of the LED lamp system of FIG. 2, according to one embodiment.
Figure 3B:
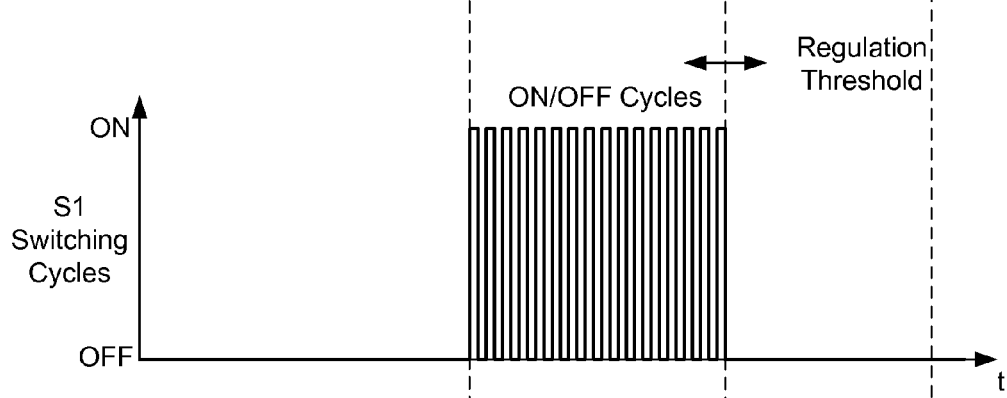
FIG. 3B illustrates an example control signal waveform of the LED lamp system of FIG. 2, according to one embodiment.
Figure 3C:
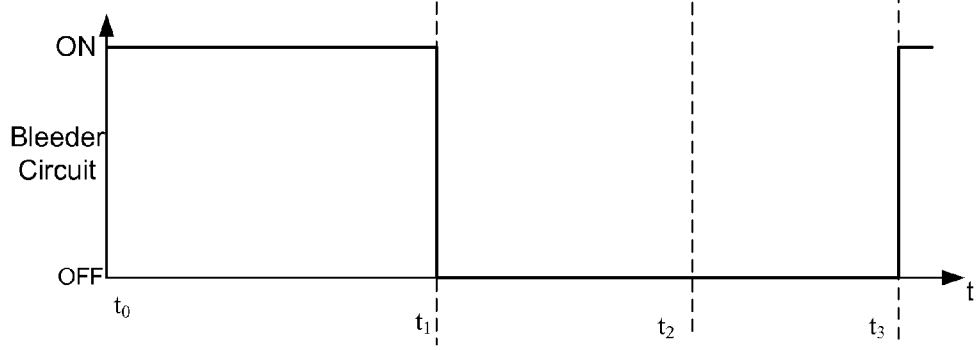
FIG. 3C illustrates an example bleeder circuit control signal waveform of the LED lamp system of FIG. 2, according to one embodiment.

FIGS. 3A through 3C illustrate example waveforms of the LED lamp system 100 of FIG. 2. FIG. 3A shows voltage waveforms of the LED lamp system 100 of FIG. 2. Waveform 302 is the AC input voltage 118 outputted by the dimmer switch 104 and waveform 304 is the AC voltage 122 supplied by the AC mains 114. Waveform 304 (dotted line) is superimposed on the waveform 302. As illustrated, the AC input voltage 118 includes a first portion 302a where the AC input voltage 118 is zero and a second portion 302b where the AC input voltage 118 is non-zero. The first portion and the second portion alternate. FIG. 3B illustrates an example waveform representing a control signal 242 generated by the power stage controller 216 of the LED lamp system 100 of FIG. 2. As shown in FIG. 3B, the power stage controller 216 generates a control signal 242 when the AC input voltage 118 meets or exceeds the specified threshold value $V_{TH1}$ or range at time $t_1$. The control signal 242 cycles between ON and OFF states to switch on and off the power stage switch 218. The power stage controller 216 continues to generate a control signal 242 that cycles between ON and OFF states until a regulation threshold (i.e., whether the energy being delivered to the output stage 214 is sufficient to maintain the proper output regulation of the LED string 112) is met as previously described with respect to FIG. 2.

FIG. 3C illustrates an example waveform representing a control signal 242 generated by the bleeder circuit controller 206 of the LED lamp system 100 of FIG. 2. As shown in FIG. 3C, the bleeder circuit controller 206 monitors the waveform 302 of the AC input voltage 118 and enables the bleeder circuit 108 when the AC input voltage 118 is less than the threshold value $V_{TH1}$. As illustrated, during the period ($t_0$-$t_1$) corresponding to the first portion 302a of the AC input voltage 118, the voltage level of the AC input voltage 118 is less than the first threshold value $V_{TH1}$ and the bleeder circuit 108 is enabled to provide a bleeder current. The bleeder circuit controller 206 disables the bleeder circuit 108, at time $t_1$, when the voltage level of the AC input voltage 118 is greater than the threshold value $V_{TH2}$. As illustrated, during the period ($t_1$-$t_3$) corresponding to the second portion 302b of the AC input voltage 118 when the voltage level of the AC input voltage 118 is non-zero, the bleeder circuit 108 is disabled. The bleeder circuit 108 is not enabled during high dissipative periods. As illustrated, the bleeder circuit 108 is disabled even during the period ($t_2$-$t_3$) when the switching of the power stage switch 218 is disabled, and enabled at or near the zero crossing voltage of the AC input voltage 118 when the dimmer switch 104 is turned off and the AC mains 114 is disconnected from the rectifier circuit 106.

Figure 4A:
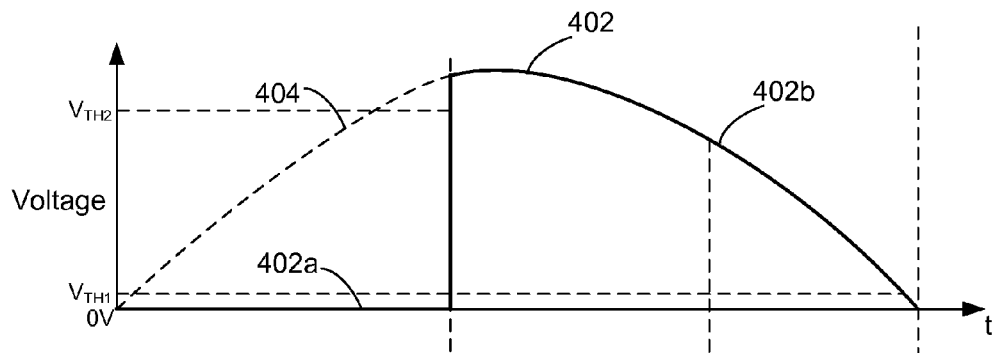
FIG. 4A illustrates example voltage waveforms of the LED lamp system of FIG. 2, according to another embodiment.
Figure 4B:
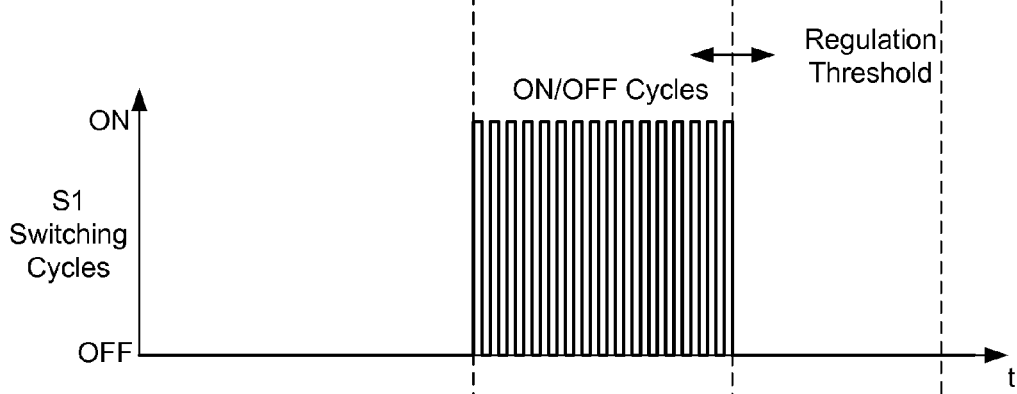
FIG. 4B illustrates an example control signal waveform of the LED lamp system of FIG. 2, according to another embodiment.
Figure 4C:
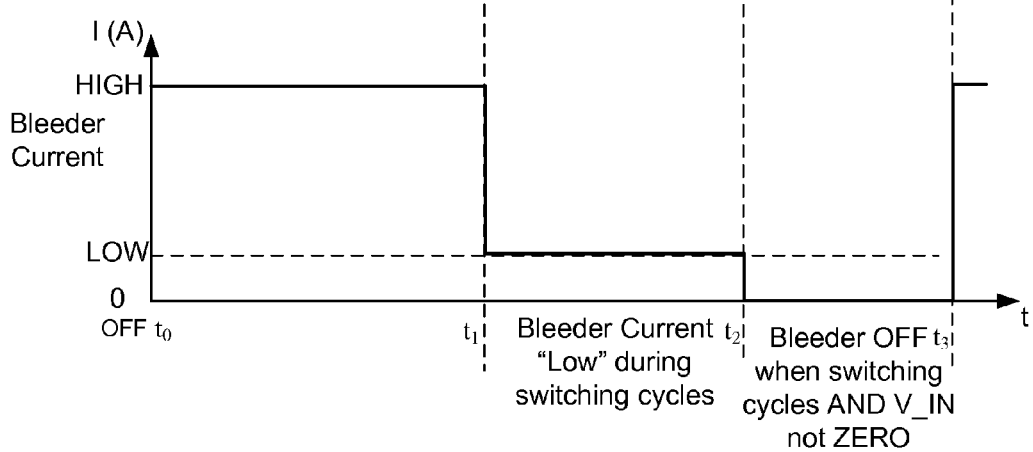
FIG. 4C illustrates example bleeder current waveforms of the LED lamp system of FIG. 2, according to another embodiment.

FIGS. 4A-4C illustrate example waveforms of the LED lamp system 100 of FIG. 2 according to another embodiment. FIGS. 4A and 4B are equivalent to FIGS. 3A and 3B, respectively. As illustrated, the AC input voltage 118 includes a first portion 402a where the AC input voltage 118 is zero and a second portion 402b where the AC input voltage 118 is non-zero. The first portion and the second portion alternate. FIG. 4C illustrates an example bleeder current waveform provided by the bleeder circuit 108 of the LED lamp system 100 of FIG. 2. As shown in FIG. 4C, the bleeder circuit generates a bleeder current having different output levels. During the period ($t_0$-$t_1$) corresponding to the first portion 402a of the AC input voltage 118, the voltage level of the AC input voltage 118 is less than the first threshold value $V_{TH1}$ and the bleeder circuit is enabled to provide a bleeder current to discharge the capacitor included in the rectifier circuit. The driver circuit 110 is enabled, at time $t_1$, when the voltage level of the AC input voltage 118 is greater than the threshold value $V_{TH2}$. During the period ($t_1$-$t_3$) corresponding to the second portion 402b of the AC input voltage 118 when the voltage level of the AC input voltage 118 is non-zero, the bleeder current is reduced. For example, as illustrated, during the time period ($t_1$-$t_2$), the bleeder current circuit 110 generates a bleeder current at a low level to ensure the triac included in the dimmer switch 104 remains in the conducting state while the power stage 212 switching cycles are enabled. The low level of the bleeder current is set based on the holding current threshold of the dimmer switch 104 and the driving current through the LED string 112. During the time period ($t_2$-$t_3$), the bleeder current is reduced to approximately 0 A and the driver circuit 110 disables the switching cycles.

Upon reading this disclosure, those of skill in the art will appreciate still additional alternative designs for controlling dimming of an LED lamp using an adaptive bleeder current control. Thus, while particular embodiments and applications of the present disclosure have been illustrated and described, it is to be understood that the disclosure is not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure.

What is claimed is:

1. A light-emitting diode (LED) lamp, comprising:
an LED string including one or more LEDs;
a rectifier circuit configured to receive an AC input voltage and to generate a rectified voltage corresponding to the AC input voltage, the rectified voltage is a phase-cut AC input voltage indicating a dimming level;
a bleeder circuit coupled to the rectifier circuit and configured to turn on to provide a bleeder current at a first current level responsive to the AC input voltage less than a first threshold voltage and to reduce the bleeder current to a second current level responsive to the AC input voltage exceeding a second threshold voltage; and
an LED driver circuit configured to switch on or off a power stage switch according to a duty cycle based on the rectified voltage, to regulate a driving current through the LED string.

2. The LED lamp of claim 1, wherein:
the AC input voltage includes a first portion during which the AC input voltage is zero and a second portion during which the AC input voltage is non-zero, the first portion alternating with the second portion; and
the first threshold voltage and the second threshold voltage are set such that the bleeder circuit is configured to turn on during the first portion of the AC input voltage and turn off during the second portion of the AC input voltage.

3. The LED lamp of claim 1, wherein:
the AC input voltage includes a first portion during which the AC input voltage is zero and a second portion during which the AC input voltage is non-zero, the first portion alternating with the second portion;
the LED driver circuit is configured to switch on or off the power stage switch according to the duty cycle based on the rectified voltage during a part of the second portion of the AC input voltage;
the first threshold voltage is set such that the bleeder circuit is configured to turn on during the first portion of the AC voltage;
the second threshold voltage is set such that the bleeder circuit reduces the bleeder current to the second current level during said part of the second portion of the AC voltage; and
the bleeder circuit is configured to turn off during a remaining part of the second portion of the AC voltage.

4. The LED lamp of claim 1, wherein the first threshold voltage is less than the second threshold voltage.

5. The LED lamp of claim 1, wherein the bleeder current flows through a triac external to the LED string, the rectifier circuit, and the bleeder circuit.

6. The LED lamp of claim 1, wherein the bleeder circuit comprises:

a first switch configured to be turned on to provide the bleeder current or turned off to stop the bleeder current; and a first controller configured to generate a first control signal to turn on or off the first switch based on the AC input voltage.

7. The LED lamp of claim 6, wherein the LED driver circuit comprises a power stage switch configured to be turned on to connect the rectified voltage to the LED driver circuit and turned off to disconnect the rectified voltage to the LED driver circuit; and a second controller configured to generate a second control signal having the duty cycle, the power stage switch being turned on or off responsive to the second control signal according to the duty cycle.

8. The LED lamp of claim 7, wherein the first controller and the second controller are packaged in an integrated circuit.

9. The LED lamp of claim 1, wherein the second current level is determined according to the duty cycle and a triac external to the LED string, the rectifier circuit, and the bleeder circuit.

10. A method of powering a light-emitting diode (LED) string, comprising:

receiving an AC input voltage and generating a rectified voltage corresponding to the AC input voltage, the rectified voltage being a phase-cut voltage indicating a dimming level;

determining a level of the AC input voltage;

providing a bleeder current at a first current level responsive to the AC input voltage being less than the first threshold voltage, and reducing the bleeder current to a second current level responsive to the AC input voltage exceeding the second threshold voltage; and regulating a driving current through the LED string by switching on or off a power stage switch according to a duty cycle based on the rectified voltage.

11. The method of claim 10, wherein:

the AC input voltage includes a first portion during which the AC input voltage is zero and a second portion during which the AC input voltage is non-zero, the first portion alternating with the second portion; and the first threshold and the second threshold are set such that the bleeder current is at the first current level during the first portion of the AC input voltage and the bleeder current is at the second current level during the second portion of the AC input voltage.

12. The method of claim 10, wherein:

the AC input voltage includes a first portion during which the AC input voltage is zero and a second portion during which the AC input voltage is non-zero, the first portion alternating with the second portion;

the power stage switch is switched on or off according to the duty cycle based on the rectified voltage during a part of the second portion of the AC input voltage;

the first threshold is set such that the bleeder current is at the first level during the first portion of the AC voltage;

the second threshold is set such that the bleeder current is at the second level during said part of the second portion of the AC voltage; and the bleeder current is zero during a remaining part of the second portion of the AC voltage.

13. The method of claim 10, wherein the first threshold voltage is less than the second threshold voltage.

14. The method of claim 10, wherein the bleeder current is provided to flow through a triac external to the LED string.

15. The method of claim 10, wherein the step of providing the bleeder current comprises generating a first control signal based on the AC input voltage to switch on or off a first switch to provide the bleeder current at the first level.

16. The method of claim 15, wherein the step of regulating the driving current comprises generate a second control signal having the duty cycle, the power stage switch being turned on or off responsive to the second control signal according to the duty cycle of the second control signal.

17. The method of claim 10, wherein the duty cycle is determined according to a dimming control signal indicative of the dimming level.

18. The method of claim 10, wherein the second current level is determined according to the duty cycle and a triac external to the LED string, the rectifier circuit, and the bleeder circuit.

* * * * *